(12) United States Patent
Niki

(10) Patent No.: US 8,050,015 B2
(45) Date of Patent: Nov. 1, 2011

(54) COMPOSITE ELECTRIC ELEMENT

(75) Inventor: Kazuya Niki, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 306 days.

(21) Appl. No.: 12/445,338

(22) PCT Filed: Sep. 27, 2007

(86) PCT No.: PCT/JP2007/068859
§ 371 (c)(1),
(2), (4) Date: Apr. 13, 2009

(87) PCT Pub. No.: WO2008/044483
PCT Pub. Date: Apr. 17, 2008

(65) Prior Publication Data
US 2010/0033904 A1 Feb. 11, 2010

(30) Foreign Application Priority Data
Oct. 13, 2006 (JP) ................. 2006-280729

(51) Int. Cl.
*H01G 9/00* (2006.01)
(52) U.S. Cl. ........ 361/523; 361/516; 361/519; 361/525; 361/528; 361/529
(58) Field of Classification Search .......... 361/523, 361/516–519, 525, 528–529, 530–531, 540–541, 361/509–512, 306.3
See application file for complete search history.

(56) References Cited

U.S. PATENT DOCUMENTS

| | | | |
|---|---|---|---|
| 6,288,890 B1 * | 9/2001 | Saito et al. | 361/523 |
| 7,050,291 B2 * | 5/2006 | Narendra et al. | 361/502 |
| 7,719,821 B2 * | 5/2010 | Kato et al. | 361/502 |
| 7,872,852 B2 * | 1/2011 | Liao et al. | 361/303 |

FOREIGN PATENT DOCUMENTS

| | | |
|---|---|---|
| JP | 9-232196 A | 9/1997 |
| JP | 2000-269076 A | 9/2000 |
| JP | 2002-299159 A | 10/2002 |
| JP | 2006-100708 A | 4/2006 |

OTHER PUBLICATIONS

International Search Report of PCT/JP2007/068859, date of mailing Dec. 25, 2007.

* cited by examiner

*Primary Examiner* — Nguyen T Ha
(74) *Attorney, Agent, or Firm* — Westerman, Hattori, Daniels & Adrian, LLP

(57) ABSTRACT

A composite electric element includes a solid electrolytic capacitor and an electric element disposed on the solid electrolytic capacitor. A conductive plate, which is less resistive than an internal conductive layer, is connected to and covers the composite electric element. A current from a power source and its return current from an electric load flow across the internal conductive layer of the composite electric element in opposite directions. The composite electric element is disposed on a surface of a module substrate, and a slit is provided on the ground so that more current flows inside the electric element in opposite directions.

12 Claims, 16 Drawing Sheets

(a)

(b)

(c)

(d)

(a)

(b)

(a)

(b)

(c)

(d)

(a)

(b)

COMPOSITE ELECTRIC ELEMENT

TECHNICAL FIELD

The present invention relates to composite electric elements comprising a ceramic electric element and a solid electrolytic capacitor combined together, which is effective over a wide range of high-frequencies.

BACKGROUND ART

In recent years, digital circuit technologies such as the LSI (Large Scale Integrated) circuit are used not only for computers or communication-related equipment, but also for home appliances or in-vehicle equipment.

As devices are becoming smaller, smaller parts are required. In addition, as operating frequencies have been increased as a result of increase in the operating speed of each device, the LSI mentioned above requires a large amount of current. Therefore, a part to supply the large amount of current to the LSI is needed.

A high-frequency current generated in, for example, the LSI does not stay in the vicinity of the LSI. The high-frequency current widely spreads in the mount circuit board such as a printed-circuit board, inductively couples to the signal wirings and ground wirings, and then leaks from, for example, the signal cables as an electromagnetic wave.

In mixed-signal circuits having both of an analog circuit and a digital circuit, such as a conventional analog circuit a part of which is replaced with a digital circuit, or a digital circuit having an analog input/output, one of the serious problems is electromagnetic interference from the digital circuit to the analog circuit.

In order to overcome the above problems, a ceramic capacitor 600 is used to deal with the problem of noise, however, there are problems in that changes in the characteristics, such as temperature, are drastic. A tantalum solid electrolytic capacitor 700, which is small in size but has a large capacity, is also used, however, its impedance at a high frequency is great, and noise is not reduced to a sufficient level.

To deal with the above-mentioned problems with the characteristics, a well-know composite part 800 comprises the tantalum solid electrolytic capacitor 700 and the ceramic capacitor 600, which are connected parallel to each other with a lead frame 601 interposed therebetween, and is sealed with an external resin member as shown in FIG. 12 (Patent Document 1).

Patent Document 1: Japanese Unexamined Patent Application Publication No. 9-232196.

DISCLOSURE OF INVENTION

Problems to be Solved by the Invention

The conventional composite part is problematic in that it is hard to make the part smaller as the ceramic capacitor and the tantalum solid electrolytic capacitor are disposed side by side. In addition, when carrying a large amount of current, the conventional composite part generates heat.

With respect to the impedance, the capacitance is dominant at low frequencies, while the inductance is dominant at high frequencies. At a frequency where the capacitance is dominant, the impedance is decreased by means of the tantalum solid electrolytic capacitor. On the other hand, at a frequency where the inductance is dominant, since the ceramic capacitor lacks a function to proactively reduce the inductance, the impedance cannot be lower than that determined by the inherent inductance of the ceramic capacitor. Accordingly, any further reduction in noise at a high frequency cannot be expected.

The present invention is aimed at solving the aforementioned problems, and one of its objects is to provide an electric element which is small, generates less heat, and decreases the inductance and hence the impedance to reduce noise.

Means for Solving the Problems

According to the present invention, an composite electric element comprises:

an electric element that is substantially a rectangular parallelepiped 1 comprising a plurality of first conductive layers, a plurality of second conductive layers, and a plurality of dielectric layers interposed between the first conductive layers and the second conductive layers, the electric element comprising a first electrode to which the plurality of first conductive layers are connected parallel to each other on one end of first side surfaces, the first surface being substantially perpendicular to the bottom surface of the rectangular parallelepiped 1 and facing each other, a second electrode to which the plurality of first conductive layers are connected parallel to each other on the other end of the first side surfaces, a third electrode to which the plurality of second conductive layers are connected parallel to each other on one end of a second side surface, the second side surface being substantially perpendicular to the bottom surface and the first side surfaces and facing each other, and a fourth electrode to which the plurality of second conductive layers are connected parallel to each other on the other end of the second side surface; and a solid electrolytic capacitor comprising:
a capacitor element and
an electrode,
the capacitor element comprising:
an anode part and
a cathode part, the cathode part having a dielectric film, a solid electrolyte and an extended cathode layer on a surface of the anode part,
the electrode being connected to the anode part and the cathode part and having part exposed on a part where the anode part and the cathode part are covered with an external resin member,
the solid electrolytic capacitor comprising at least one capacitor element comprising:
a fifth electrode connected to the anode part and
a sixth electrode connected to the cathode part; wherein
the composite electric element is substantially a rectangular parallelepiped 2 comprising the solid electrolytic capacitor and the electric element disposed thereon, and includes a seventh electrode, an eighth electrode, a ninth electrode, and a tenth electrode disposed with a space in the longitudinal direction of the bottom surface of the rectangular parallelepiped 2; and with respect to connection of the solid electrolytic capacitor, the electric element, and the spaced electrodes,
the seventh electrode and the first electrode are connected,
the second electrode, the fifth electrode and the tenth electrode are connected,
the ninth electrode, the sixth electrode and the fourth electrode are connected, and
the third electrode and the eighth electrode are connected.

Preferably, the third electrode of the electric element, which is away from the center of the second side surface and in the proximity of the first electrode in a facing direction of the first side surfaces, connects all the surfaces of the rectangular parallelepiped 1 except both edges of the upper surface, the third electrode being in a shape of the strip and disposed parallel to the first side surfaces on the bottom surface of the rectangular parallelepiped 1; and the fourth electrode of the composite electric element, which is away from the center of the second side surface and in the proximity of the second electrode in a facing direction of the first side surfaces, connects all the surfaces of the rectangular parallelepiped 1 except both edges of the upper surface, the fourth electrode being in a shape of the strip and disposed parallel to the first side surfaces on the bottom surface of the rectangular parallelepiped 1.

Preferably, the composite electric element further comprises a conductive plate;

the conductive plate and the plurality of first conductive layers are connected parallel to each other;

the resistance of each first conductive layer and each second conductive layer is greater than that of the conductive plate;

the capacitance between the conductive plate and the first conductive layer and that between the conductive plate and the second conductive layer are less than that between the first conductive layer and the second conductive layer.

Preferably, the conductive plate covers the composite electric element and is substantially vertically disposed from one end of a rectangular parallelepiped 2 so as to cover one first side surface of the electric element, then substantially horizontally along the upper surface of the electric element so as to cover it, and substantially vertically to the other end of the rectangular parallelepiped 2 so as to cover the other first side surface of the electric element.

Preferably, the eighth electrode and the ninth electrode are substantially vertically disposed, on a side surface, of the composite electric element that is the rectangular parallelepiped 2, including a second side surface of the electric element, from the lower part of the side surface of the rectangular parallelepiped 2 to the second side surface, and then to an area between the lower edge and the upper edge of the second side surface.

Preferably, the conductive plate comprises a recess on both ends in the center in the long-axis direction of the electric element that is the rectangular parallelepiped 1.

Preferably, the composite electric element is disposed between a power source and an electric load that is driven by a current from the power source;

the first conductive layer flows a first current from the power source side to the electric load side;

the second conductive layer flows a second current, which is a return current of the first current, from the electric load side to the power source side; and the first conductive layer has a smaller inductance than its self inductance when the first and second currents respectively flow across the first and second conductive layers.

Preferably, the plurality of anode parts of the capacitor element are disposed to face either of a same direction, facing directions, and opposite directions.

Preferably, the ninth electrode is connected to the bottom surface and the side surface of the cathode part of the capacitor element, substantially vertically disposed along the side surface of the solid electrolytic capacitor, and connected to the fourth electrode of the electric element.

Preferably, a gap between the ninth electrode and the side surface of the cathode part of the capacitor element is filled with resin.

Preferably, the width of the ninth electrode is larger than that of the eighth electrode.

Preferably, the ninth electrode is extended to the longitudinal direction of the cathode part at a part where the ninth electrode crosses with the cathode part of the capacitor element.

Preferably, the sixth electrode of the capacitor element is divided into an bottom part on the bottom surface of the cathode part and an upper part on the upper surface of the cathode part, the upper part of the sixth electrode being connected to the fourth electrode of the electric element; and the ninth electrode of the electric element is removed.

Preferably, the electric element and the solid electrolytic capacitor are modularized on a same surface of a substrate, the solid electrolytic capacitor being disposed parallel or perpendicular to the long-axis direction of the electric element;

the electric element is disposed on the input side of the power source; and the solid electrolytic capacitor is disposed on the output side.

Preferably, the substrate has, at a part where the electric element is to be disposed, a slit for dividing a ground layer of the substrate in the substantial center in a substantially vertical direction, the slit being disposed in the longitudinal direction of the electric element.

Preferably, the plurality of anode parts of the capacitor element are disposed to face either of a same direction, facing directions and opposite directions.

Advantageous Effect of the Invention

According to the present invention, the composite electric element is miniaturized by disposing the electric element on the solid electrolytic capacitor. In addition, when mounting the composite electric element to the substrate, the solid electrolytic capacitor is disposed beneath and hence closer to the electric load, which results in a decreased inductance of the traces. Accordingly, it is easier to supply a current that changes in the electric load. Further, comprising conductive plates, resistance of which is less than that of the conductive layer, connected parallel to each other, the composite electric element generates less heat and carries a large amount of current.

Further, a current flows from the power source to the seventh electrode of the composite electric element, to the first electrode, the first conductive layer and the second electrode of the electric element, to the fifth electrode of the solid electrolytic capacitor, and to the tenth electrode of the composite electric element in this order, and then to the electric load. Its return current from the electric load flows to the ninth electrode of the composite electric element, to the sixth electrode of the solid electrolytic capacitor, to the fourth electrode, the second conductive layer and the third electrode of the electric element, to the eighth electrode of the composite electric element, and then to the power source.

Accordingly, currents flow across the first conductive layer and the second conductive layer in opposite directions. A magnetic flux, direction of which is determined by the direction of current, is generated, and therefore, the self inductance is generated. However, the first conductive layer and the second conductive layer are alternately disposed, and therefore, in adjacent areas, the magnetic flux generated by the current is offset. Accordingly, generation of a magnetic flux is prevented.

In this way, the inductance decreases, and therefore, the impedance at a high frequency where the inductance is dominant decreases. Accordingly, the composite electric element is effective over high frequencies and reduces noise.

Further, the height of the composite electric element is kept low by disposing the electric element and the solid electrolytic capacitor on a same surface of the module substrate. In addition, by providing a slit provided on a ground layer of the module substrate, a current flowing across the ground layer flows into the electric element. Accordingly, more current flows across the first conductive layer and the second conductive layer in opposite directions. Therefore, the inductance decreases, and the impedance at a high frequency where the inductance is dominant decreases. Accordingly, the composite electric element is effective over high frequencies and reduces noise.

BEST MODE FOR CARRYING OUT THE INVENTION

The present invention will now be described more specifically in embodiments with reference to the drawings. In the figures, identical or like components are identically denoted by the same reference characters and explanations thereof are not repeated.

Embodiment 1

FIG. 1 is a schematic view illustrating the structure and connection of a composite electric element 100 of Embodiment 1 according to the present invention. FIG. 2 is a perspective view of an electric element 200 of the composite electric element. With reference to FIG. 1 and FIG. 2, the composite electric element 100 according to Embodiment 1 of the present invention comprises two types of components that are the electric element 200 and a solid electrolytic capacitor 300 (including a capacitor element 301, an electrode, and an external resin member). The electric element 200 is disposed on the solid electrolytic capacitor 300.

The electric element 200 is a rectangular parallelepiped 1 and comprises a dielectric layer 208, a first conductive layer 202, a second conductive layer 203, a first electrode 204, a second electrode 205, a third electrode 206, and a fourth electrode 207. FIG. 2b is a perspective view of the electric element 200 shown in FIG. 2a viewed from the bottom. FIG. 2c is a cross sectional view viewed along line A-A' shown in FIG. 2a and illustrates a laminated stack in which the dielectric layer 208, the first conductive layer 202, the dielectric layer 208, and the second conductive layer 203 are laminated in this order. FIG. 2d illustrates the first conductive layer 202 formed on the dielectric layer 208. FIG. 2e illustrates the second conductive layer 203 formed on the dielectric layer 208.

The dielectric layer 208 is formed of a ceramic material such as barium titanate, and the first conductive layer 202 and the second conductive layer 203 are mainly formed of nickel, for example.

Now, the fabrication method is explained. With reference to FIG. 2, as illustrated in FIG. 2(d), an area having a length of 12 mm and the width 4 mm in a surface of a green sheet, which is to be the dielectric layer 1 having a length of 12 mm, a width of 5 mm and a thickness of 25 μm, for example, is coated with conductive paste containing nickel by screen printing to form the first conductive layer 202 on a surface of the dielectric layer 208.

Likewise, as illustrated in FIG. 2(e), an area having a length of 11 mm and the width 5 mm in a surface of a green sheet, which is to be the dielectric layer 1, is coated with conductive paste containing nickel by screen printing to form the second conductive layer 203 on a surface of the dielectric layer 208.

After that, as illustrated in FIG. 2(c), dielectric layers on which a conductive layer is formed are sequentially laminated. In this manner, the laminated stack that is in a shape of the rectangular parallelepiped in which the dielectric layer 208, the first conductive layer 202, the dielectric layer 208, and the second conductive layer 203 are laminated in this order is formed.

Then, as illustrated in FIG. 2(a) and FIG. 2(b), conductive paste containing nickel is applied to the upper surface, the side surfaces and the bottom surface of the rectangular parallelepiped in order to form the third electrode 206 and the fourth electrode 207.

Then, the element fabricated as illustrated in FIG. 2(a) is burned at 1350 degrees Celsius to complete the fabrication. After burning, the electrodes are coated with Ni, Au, Su, Cu etc., if necessary, in consideration of solder wettability, for example.

Then, as illustrated in FIG. 1, the electric element is disposed on the solid electrolytic capacitor 300 (comprising the capacitor element 301). A seventh electrode 101 of the composite electric element 100 and the first electrode 204 of the electric element are connected. An eighth electrode 103 of the composite electric element and the third electrode 206 of the electric element are connected. A ninth electrode 104 of the composite electric element, the fourth electrode 207 of the electric element, and a sixth electrode 303 of the solid electrolytic capacitor are connected. A tenth electrode 102 of the composite electric element, the second electrode 205 of the electric element, and a fifth electrode 302 of the solid electrolytic capacitor are connected.

Here, while some electrodes are exposed, a gap between the electric element 200 and the capacitor element 301 illustrated in FIG. 1 is filled with the external resin member 106 and sealed up for completion of the fabrication. The composite electric element 100 may be obtained by printing each pattern of many conductive layers onto a large dielectric sheet, laminating the sheets, burning the laminated sheets, and cutting into respective pieces.

A similar composite electric element is obtained by connecting a solid electrolytic capacitor, which has already been sealed up with an external resin member, and an electric element.

As illustrated in FIG. 1, the electric element 200 is disposed on the solid electrolytic capacitor (comprising the capacitor element 301), and therefore, the composite electric element is smaller than the conventional one. In addition, being disposed beneath, the solid electrolytic capacitor is close to the electric load, which result in a decrease in the inductance of the wires. Therefore, it is possible to deal with a drastic change in current that flows across the electric load.

Embodiment 2

FIG. 3 is a schematic view illustrating the structure of the composite electric element 100 according to Embodiment 2 of the present invention.

FIG. 3(a) illustrates the composite electric element 100 viewed from the overhead. FIG. 3(b) is a schematic perspective view of the composite electric element 100 viewed from the side. FIG. 3(c) is a cross sectional view viewed along line A-A' shown in FIG. 3(b). FIG. 3(d) illustrates the composite electric element 100 viewed from the bottom.

FIG. 4 is a perspective view illustrating the electric element 200 of the composite electric element and the current flow therein. FIGS. 3 and 4 are different from FIGS. 1 and 2 in that the second conductive layer 203, the third electrode terminal 206, and the fourth electrode terminal 207 are different from their counterpart, which is the difference between Embodiment 1 and Embodiment 2.

According to the difference in the second conductive layer 203, the third electrode terminal 206 is disposed, in the proximity of the first electrode, on part of the upper surface, the side surfaces and the bottom surface of the electric element that is the rectangular parallelepiped 1.

The fourth electrode terminal is disposed, in the proximity of the second electrode, on part of the upper surface, the side surfaces and the bottom surface of the electric element that is the rectangular parallelepiped 1.

In Embodiment 2, a conductive plate 105 is provided, and with respect thereto, the fabrication method is different from that in Embodiment 1. The rest of the fabrication method is the same as that in Embodiment 1.

In order to attach the conductive plate, part of the first electrode 204 and the second electrode 205 of the electric element 200 is coated with cream solder. Then, as illustrated in FIG. 3(a) and FIG. 3(b), the conductive plate 105 is attached so as to cover one part of the bottom surface of the composite electric element 100 that is a rectangular parallelepiped 2, one side surface of the rectangular parallelepiped 1, the upper surface of the electric element 200 except some part, the opposite side surface of the rectangular parallelepiped 2, and the other part of the bottom surface of the rectangular parallelepiped 2. Then, they are reflowed to be soldered. Preferably, the conductive plate is formed of a highly conductive material such as copper or copper alloy.

After that, as illustrated in FIG. 3b, some part of the eighth electrode 103 and the ninth electrode 104 of the composite electric element is coated with conductive adhesive. The capacitor element 301 of the solid electrolytic capacitor 300 (to which two capacitor elements 301 are connected by filling the gap in the capacitor element 301 with conductive adhesive and then by burning) is disposed on the ninth electrode 104. Then, the third electrode 206 and the fourth electrode 207 of the electric element 200, to which the conductive plate 105 is attached, are coated with conductive adhesive and disposed on the capacitor element 301. Then, they are all burned to connect the electric element 100 and the capacitor element 301.

Then, while some part of the electrodes are exposed, a gap between the electric element 200 and the capacitor element 301 shown in FIG. 3(b) is filled with the external resin member 106 and sealed up for completion of the fabrication.

The conductive plate may also be covered with an external resin member except some part of electrodes of the conductive plates.

With reference to FIG. 3(b) and FIG. 4, in the composite electric element, a current flows from a power source 400 to the seventh electrode 101 of the composite electric element 100, to the first electrode 204, the first conductive layer 202 and the second electrode 205 of the electric element 200, to the fifth electrode 302 of the solid electrolytic capacitor, and to the tenth electrode 102 of the composite electric element 100, in this order, and then to the electric load 500.

Its return current flows from the electric load to the ninth electrode 104 of the composite electric element 100, the fifth electrode 303 of the capacitor element, the fourth electrode 207 (which is invisible as is disposed underneath the ninth electrode 104), the second conductive layer 203, and the third electrode 206 (which is invisible as is disposed underneath the ninth electrode 103) of the electric element 200, and to the eighth electrode 103 of the composite electric element 100, and then to the power source.

Then, as illustrated in FIGS. 4(f) and 4(g), currents flow across the first conductive layer 202 and the second conductive layer 203 in opposite directions. Therefore, because of an offset in the magnetic field as a result of the current flow in opposite directions, the inductance decreases. Accordingly, the impedance at a high frequency where the inductance is dominant decreases, which result in a noise reduction.

In addition, as illustrated in FIG. 3(b), the electric element 200 is disposed on the capacitor element 301, and therefore, the composite electric element 100 is smaller than the conventional one. Further, the conductive plate 105 of less resistivity is connected to the first conductive layer in parallel, and therefore, the composite electric element 100 generates less heat and carries a large amount of current.

As described above, contact between the third electrode and the fourth electrode of the electric element 200 is prevented by providing a recess in the center of the conductive plate 105.

Embodiment 4

FIGS. 5(a) and 5(b) illustrate the composite electric element 100 which is identical with the composite electric element 100 according to Embodiment 3 except that the conductive plate 105 here has no recess in its center. On the side surface, of the composite electric element 100 that is the rectangular parallelepiped 2, including a second side surface of the electric element 100, the eighth electrode and the ninth electrode are substantially vertically disposed from the lower part of the side surface of the rectangular parallelepiped 2 to the second side surface. The eighth electrode and the ninth electrode are further disposed to an area between the lower edge and the upper edge of the second side surface, and therefore, a short-circuit due to contact between the electrodes and the conductive plate 105 is avoided. In addition, comprising the conductive plate covering the whole upper surface of the electric element 100, the composite electric element 100 can carry a large amount of current and release more heat than the composite electric element 100 according to Embodiment 3.

Embodiment 5

FIG. 6 illustrates the structure of the composite electric element 100 according to Embodiment 5 of the present invention. FIG. 6(a) illustrates the composite electric element 100 viewed from the overhead. FIG. 6(b) is a schematic perspective view illustrating the composite electric element 100 viewed from the side. FIG. 6(c) is a cross sectional view viewed along line A-A' shown in FIG. 6(b). FIG. 6(d) illustrates the composite electric element 100 viewed from the bottom.

With reference to FIG. 6(b), in the composite electric element 100, in the short-axis direction of the composite electric element 100, a gap between the side surface of the capacitor element 301 and the ninth electrode 104 is filled with the external resin member 106. The rest of the composite electric element 100 is identical with the composite electric element 100 according to Embodiment 2.

This means that the external resin member covers wider area of the capacitor element 301 than that in Embodiment 2.

Therefore, the reliability is improved because of the humidity resistance improved by the use of resin.

Embodiment 6

FIG. 7 illustrates the structure of the composite electric element 100 according to Embodiment 6 of the present invention. FIG. 7(a) illustrates the composite electric element 100 viewed from the overhead. FIG. 7(b) is a schematic perspective view of the composite electric element 100 viewed from the side. FIG. 7(c) is a cross sectional view viewed along line A-A' shown in FIG. 7(b). FIG. 7(d) illustrates the composite electric element 100 viewed from the bottom.

With reference to FIG. 7(b), the sixth electrode 303 of the capacitor element is divided into the upper surface and the lower surface. The upper surface of the sixth electrode is connected to the fourth electrode of the electric element 200, and the lower surface of the sixth electrode is exposed on a surface of the external resin member 106 of the composite electric element 100. The ninth electrode of the composite electric element 100 is removed. The rest of the composite electric element 100 is identical with that of the composite electric element 100 according to Embodiment 2.

Accordingly, a current flows from the electric load 500 to the lower surface of the sixth electrode of the capacitor element, to the capacitor element, to the upper surface of the sixth electrode, to a fourth bottom-surface electrode terminal 210 of the electric element 200, and to the fourth electrode terminal 207. Therefore, the ninth electrode 104 of the composite electric element according to Embodiment 2 is unnecessary, and the fabrication method becomes more simple.

Embodiment 7

FIG. 8 illustrates the structure of the composite electric element 100 according to Embodiment 5 of the present invention. FIG. 8(a) illustrates the composite electric element 100 viewed from the overhead. FIG. 8(b) is a schematic perspective view of the composite electric element 100 viewed from the side. FIG. 8(c) is a cross sectional view viewed along line A-A' shown in FIG. 8(b). FIG. 8(d) illustrates the composite electric element 100 viewed from the bottom.

With reference to FIG. 8b, the composite electric element 100 is identical with the composite electric element 100 according to Embodiment 2 except that the width of the ninth electrode 104 of the composite electric element 100 is wider than that of the eighth electrode 103.

Accordingly, having a widened width, the ninth electrode 104 of the composite electric element 100 makes better contact with the capacitor element 301, which results in an improved ESR. In addition, when fabricated, the capacitor element 301 is kept in good condition, and thereby its fabrication becomes easier.

Embodiment 8

FIG. 9 illustrates the structure of the composite electric element 100 according to Embodiment 8 of the present invention. With reference to FIG. 9, the composite electric element 100 is identical with the composite electric element 100 according to Embodiment 2 except that the ninth electrode of the composite electric element 100 is extended in the long-axis direction of the cathode part of the capacitor element, at part where the ninth electrode crosses the cathode part.

Accordingly, contact between the ninth electrode 104 and the capacitor element 301 of the composite electric element 100 is improved, which results in an improved ESR.

Embodiment 9

FIGS. 10 and 11 illustrate the structure of the composite electric element 100 according to Embodiment 9 of the present invention. The composite electric element 100 according to Embodiment 9 is fabricated by the same manner as that in Embodiment 2. With reference to FIGS. 10 and 11, the anode parts of a plurality of capacitor elements may be disposed to face one same direction, or opposite directions.

Embodiment 10

FIG. 17 illustrates the structure of the composite electric element 100 according to Embodiment 10 of the present invention. FIG. 17(a) is a schematic perspective view illustrating the composite electric element 100 viewed from the side. FIG. 17(b) is a cross sectional view viewed along line A-A' shown in FIG. 17(a). The composite electric element 100 according to Embodiment 10 is fabricated by the same manner as that in Embodiment 2.

With reference to FIG. 17, a plurality of capacitor elements are disposed on both sides of the electric element 100. If the electric element 100 only requires a small amount of capacity, the solid electrolytic capacitor may be disposed on both sides of the electric element 100 having a small width, instead of disposing the electric element on the solid electrolytic capacitor. With this configuration, the composite electric element is still small in size, and the height is made smaller.

[Example of Use]

FIG. 12 illustrates the present invention in use. The composite electric element 100 is disposed between a power source 400 and an electric load 500. In the composite electric element 100, the solid electrolytic capacitor 300 is disposed beneath the electric element 200, and therefore, is close to the electric load 500. Accordingly, its ESL and ESR decreases, and it is easier for the composite electric element 100 to deal with a drastic change in the electric load 500.

Embodiment 11

FIGS. 13 and 14 illustrate the structure of the composite electric element 100 according to Embodiment 11 of the present invention, whose components are modularized on a same surface of a substrate. As illustrated in FIG. 13, the capacitor element 301 and its fifth electrode 302 are disposed parallel to the longitudinal direction of the electric element 200.

As illustrated in FIG. 14, the capacitor element 301 and its fifth electrode 302 are disposed perpendicular to the longitudinal direction of the electric element 200. As is also illustrated in FIGS. 13 and 14, the electric element is disposed on the input terminal side, and the solid electrolytic capacitor is disposed on the output terminal side. The rest is fabricated in the same manner as that in Embodiment 2. (The external resin member is not illustrated in the figures). In this way, the electric element 200 and the solid electrolytic capacitor 300 (comprising the capacitor element 301) are modularized on the same surface of the substrate, and therefore, the height of the composite electric element 100 according to Embodiment 11 is smaller than that of Embodiment 1 in which the components are piled on top of another. Accordingly, the solid electrolytic capacitor 300 is disposed close to the electric load 500, which result in a decreased inductance of the wires. Therefore, it is easier for the composite electric element 100 to deal with a drastic change in the electric load 500. Here, the substrate may be an interposer substrate.

Embodiment 12

FIG. 15 is a schematic view the structure of the composite electric element 100 according to Embodiment 12 of the present invention whose components are modularized on a same surface of a substrate, and slits formed on the ground of the substrate.

FIG. 15(a) illustrates how the electric element 200 and the solid electrolytic capacitor 300 are disposed. FIGS. 15(b), 15(c) and 15(d) are respectively a schematic view of the upper layer, the intermediate layer and the bottom layer of the substrate where the slits are formed on the ground. The rest is fabricated by the same manner as that of Embodiment 8.

As a result, a return current flowing across the ground is regulated by the slits and flows to the second conductive layer 203 of the electric element 200. Therefore, an offset in the magnetic field as a result of current flow across the first conductive layer 202 and the second conductive layer 203 in opposite directions becomes greater. As a result, the inductance of the composite electric element 100 decreases. Accordingly, the impedance decreases, the problem of high frequencies is dealt with better, and the noise is reduced.

Embodiment 13

FIG. 16 illustrates the structure of the solid electrolytic capacitor 300 according to Embodiment 13 of the present invention. FIGS. 16(a), 16(b), 16(c), 16(d), 16(e) and 16(f) are perspective views of the solid electrolytic capacitor 300 respectively viewed from the overhead, the behind and the side. With reference to FIGS. 15(a), 15(b) and 15(c), in the solid electrolytic capacitor 300, the fifth electrodes 302 of the capacitor element are disposed to face one same direction.

With reference to FIGS. 16(d), 16(e) and 16(f), in the solid electrolytic capacitor 300, the fifth electrodes 302 of the capacitor element are disposed to face opposite directions. As described above, here, the composite electric element 100 is identical with that according to Embodiment 8 except that the solid electrolytic capacitor is formed. In this way, the composite electric element 100 is smaller in height than the composite electric element 100 according to Embodiment 1 and provides the same advantageous effect as that given in Embodiment 9.

The embodiments as have been described here are mere examples and should not be interpreted as restrictive. The scope of the present invention is determined by each of the claims, not by the written description of the embodiments, and embraces modifications within the meaning of, and equivalent to, the languages in the claims.

EXPLANATION OF REFERENCES

Figure 1:
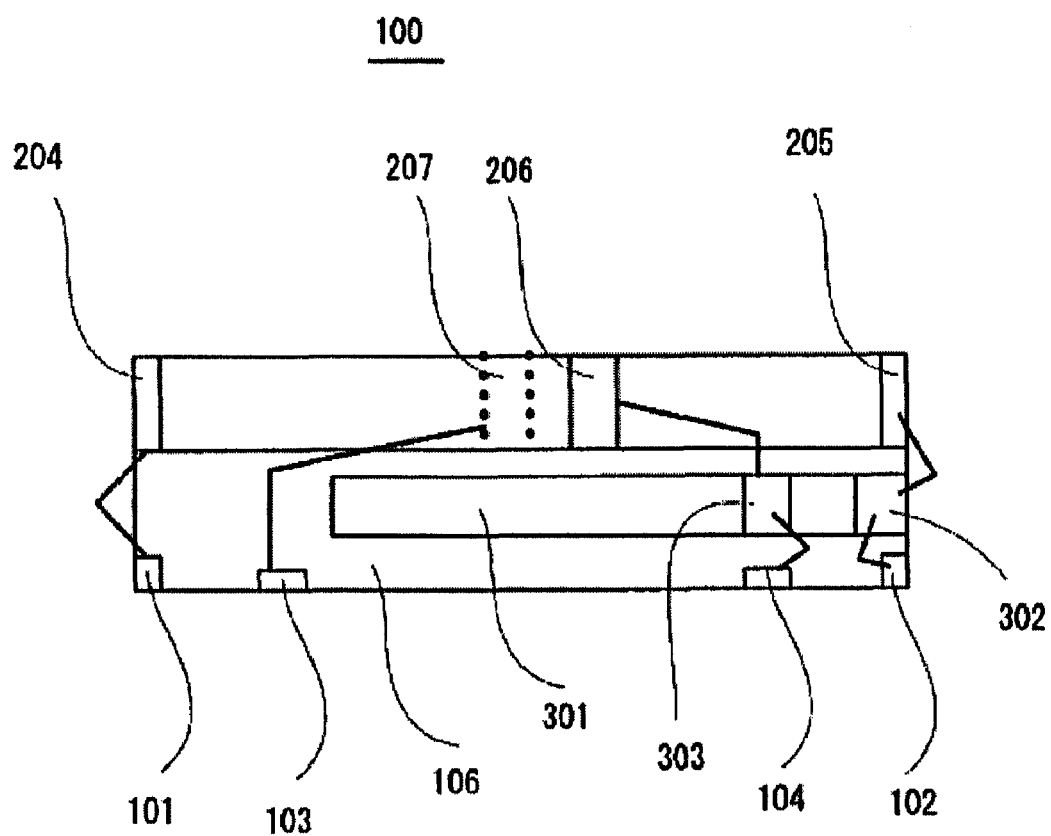
FIG. 1 is a schematic view illustrating the structure and connection of a composite electric element of Embodiment 1 according to the present invention.
Figure 2:
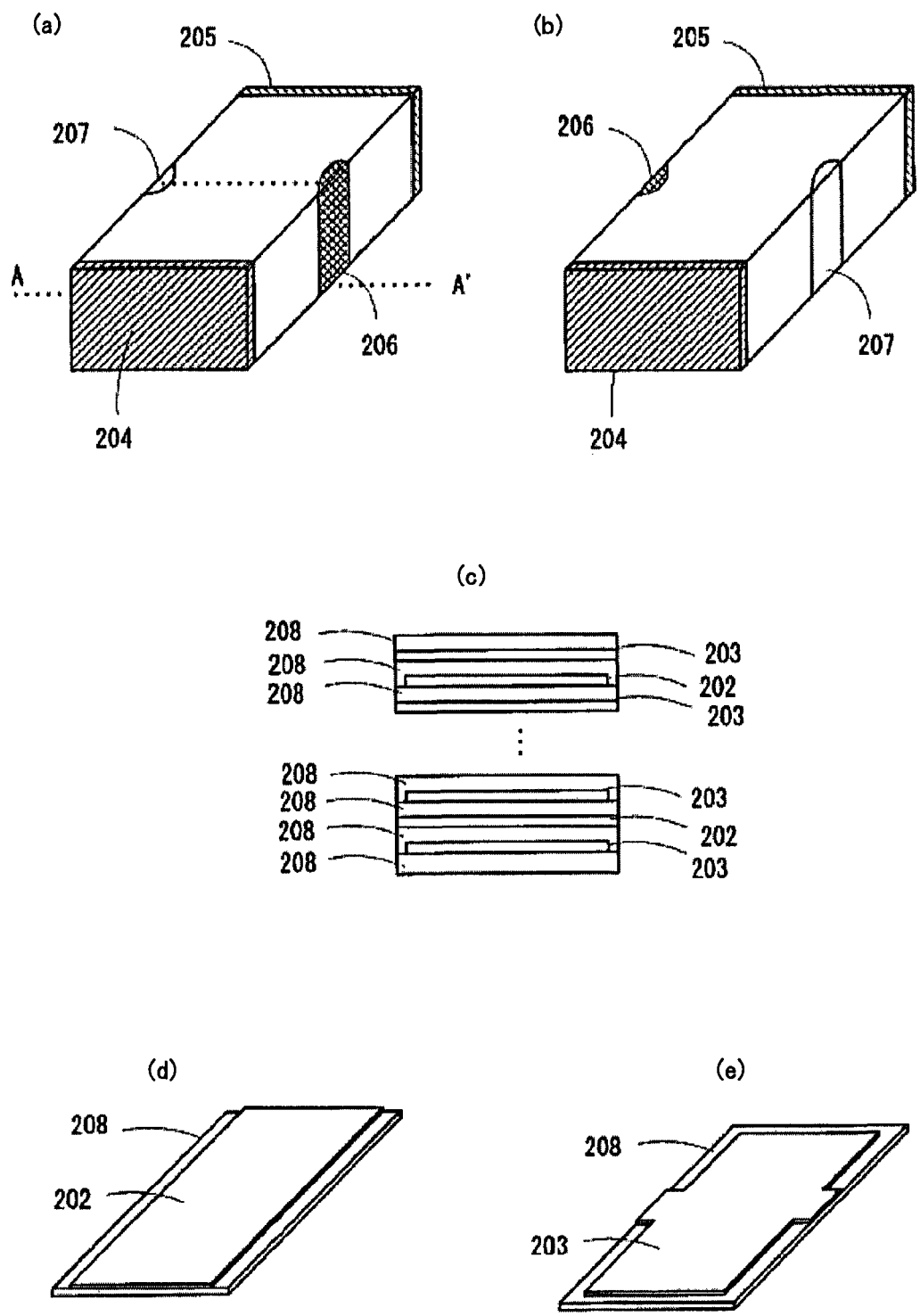
FIG. 2 illustrates a perspective view of the structure of the electric element according to Embodiment 1 of the present invention, a perspective view viewed from the bottom, a cross sectional view viewed along line A-A', a perspective view of the first conductive layer disposed on the dielectric layer, and a perspective view of the second conductive layer disposed on the dielectric layer.
Figure 3:
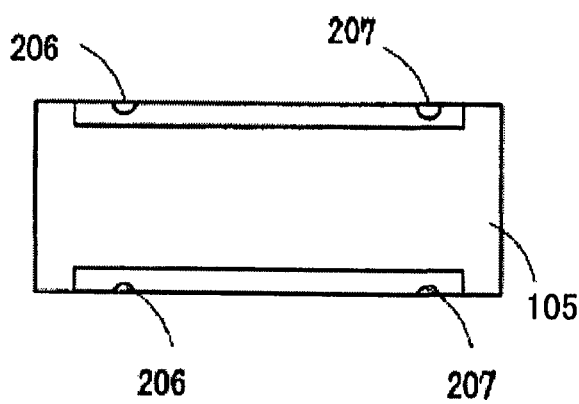
FIG. 3 is a schematic view illustrating the composite electric element according to Embodiment 2 of the present invention viewed from the overhead, a schematic perspective view viewed from the side, a cross sectional view viewed along line A-A', and a schematic view viewed from the bottom.
Figure 3:
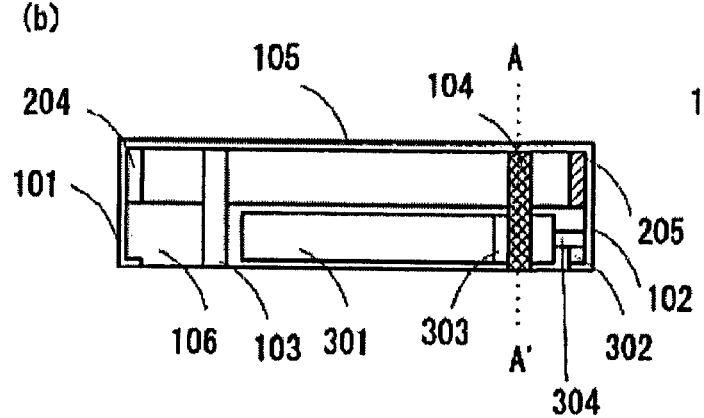
Figure 3:
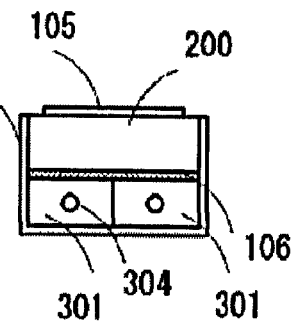
Figure 3:
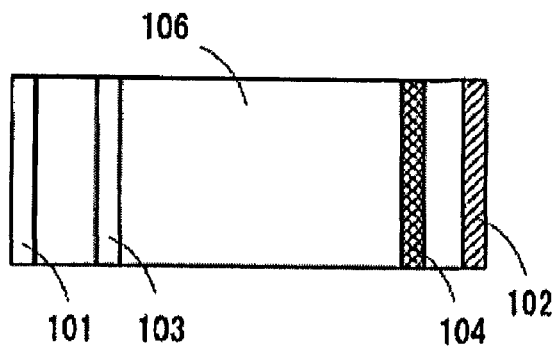
Figure 4:
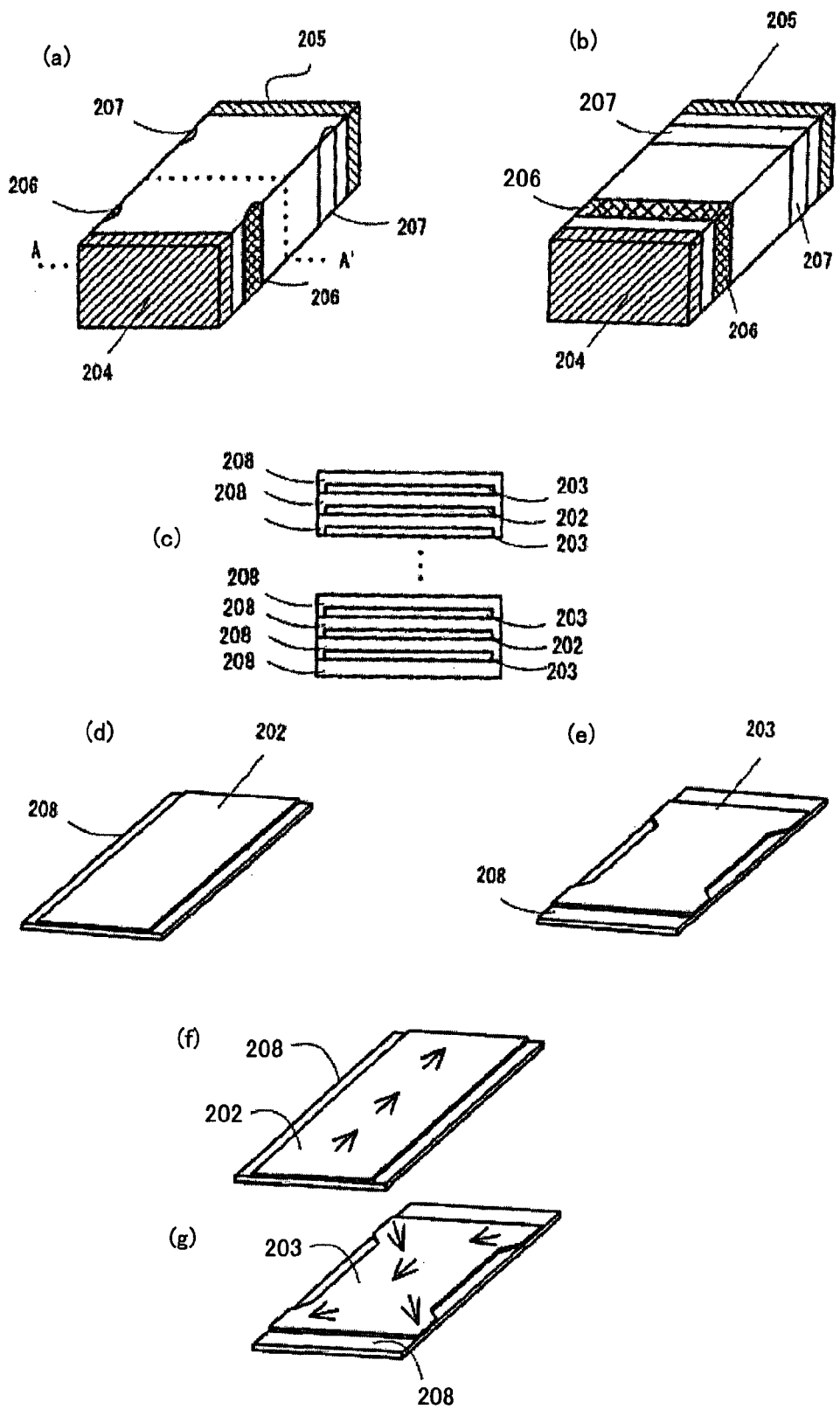
FIG. 4 illustrates a perspective view of the structure of the electric element according to Embodiment 2 of the present invention, a perspective view viewed from the bottom, a cross sectional view viewed along line A-A', a perspective view of the first conductive layer disposed on the dielectric layer, a perspective view of the second conductive layer disposed on the dielectric layer, a perspective view illustrating current flow in the first conductive layer, and a perspective view illustrating current flow in the second conductive layer.
Figure 5:
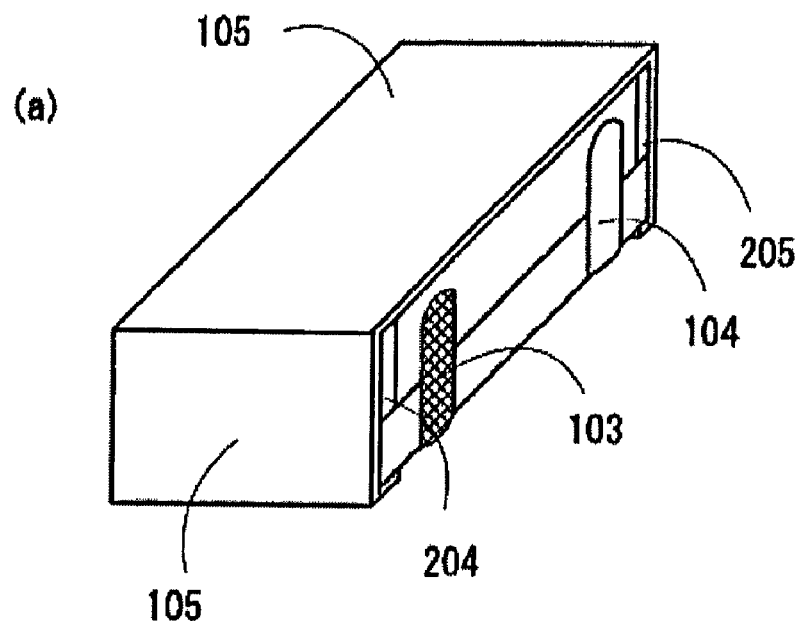
FIG. 5 illustrates two perspective views illustrating the structure of the composite electric element according to Embodiment 4 of the present invention.
Figure 5:
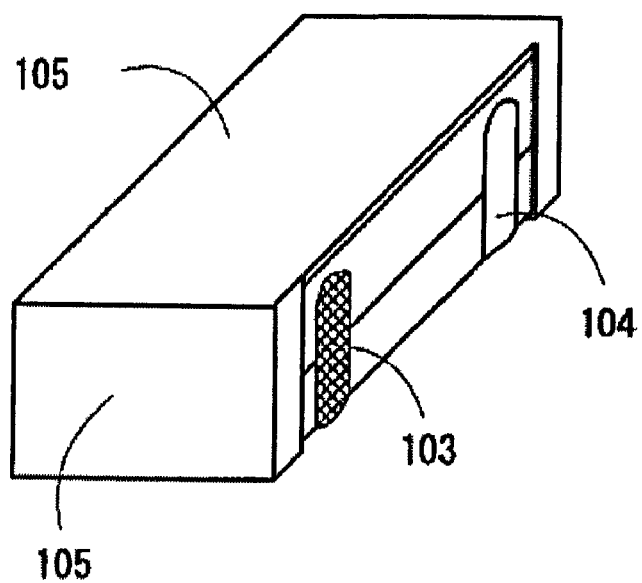
Figure 6:
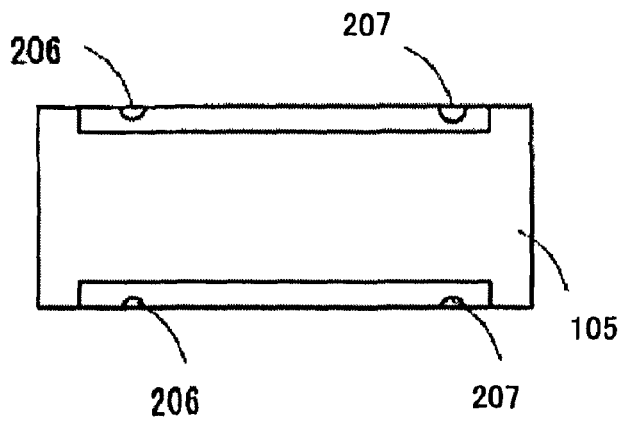
FIG. 6 illustrates a schematic view illustrating the structure of the composite electric element according to Embodiment 5 of the present invention viewed from the overhead, a schematic perspective view viewed from the side, a cross sectional view viewed along line A-A', and a schematic view viewed from the bottom.
Figure 6:
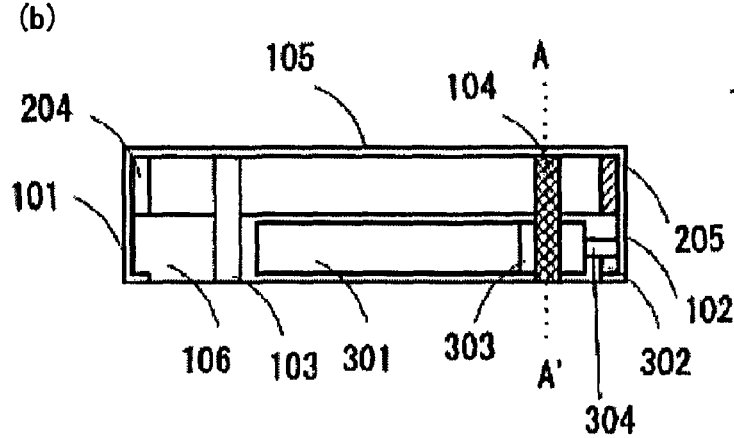
Figure 6:
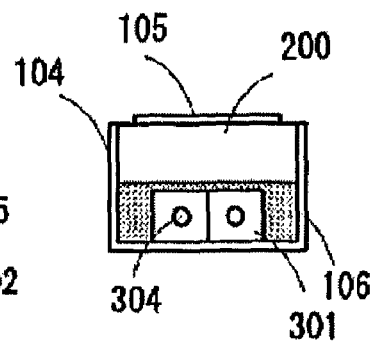
Figure 6:
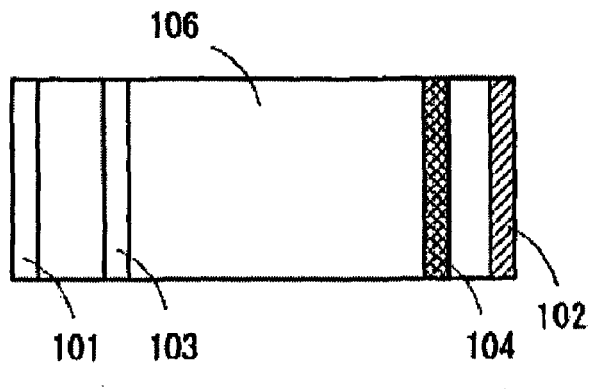
Figure 7:
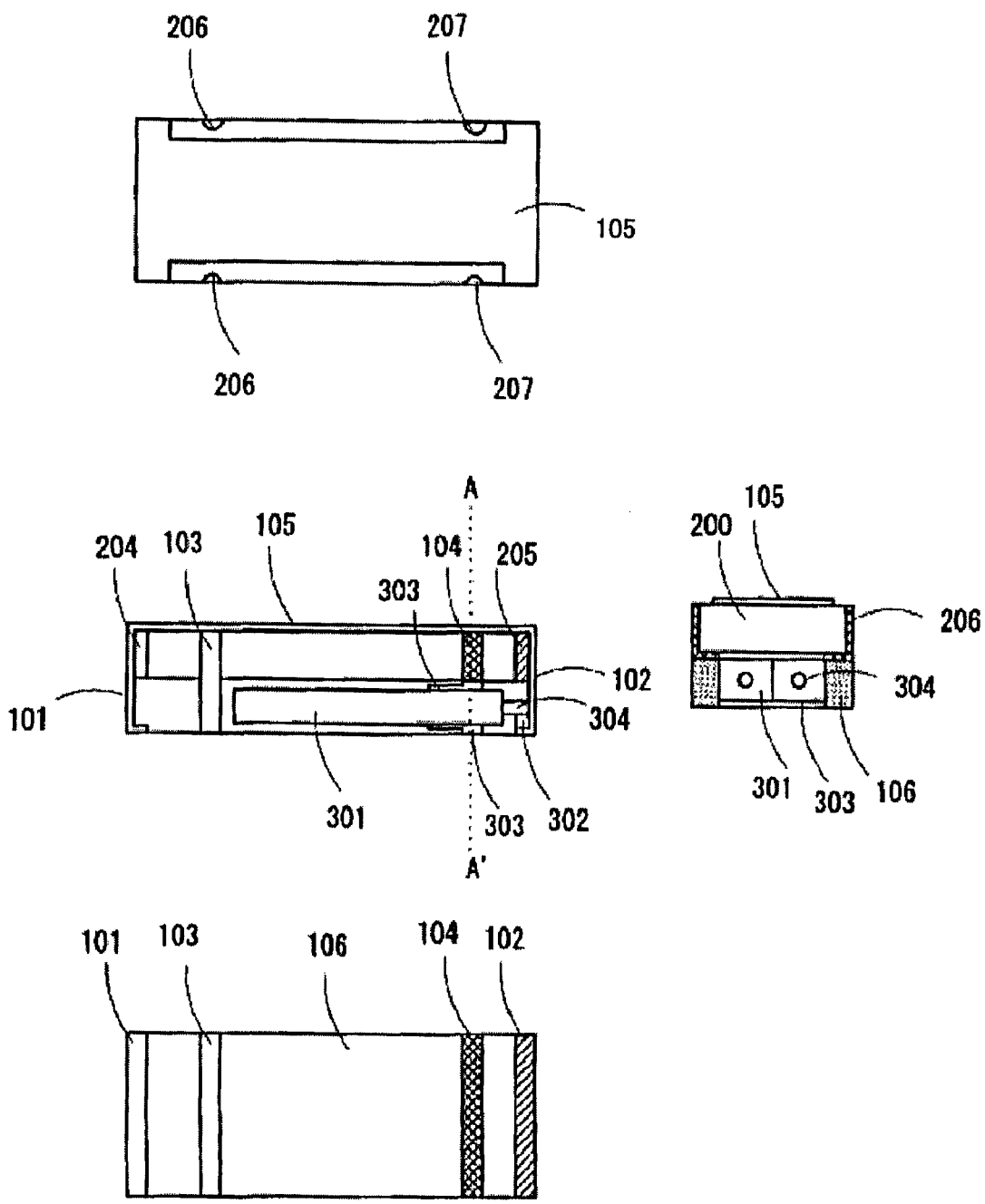
FIG. 7 illustrates a schematic view of the structure of the composite electric element according to Embodiment 6 of the present invention viewed from the overhead, a schematic perspective view viewed from the side, a cross sectional view viewed along line A-A', and a schematic view viewed from the bottom.
Figure 8:
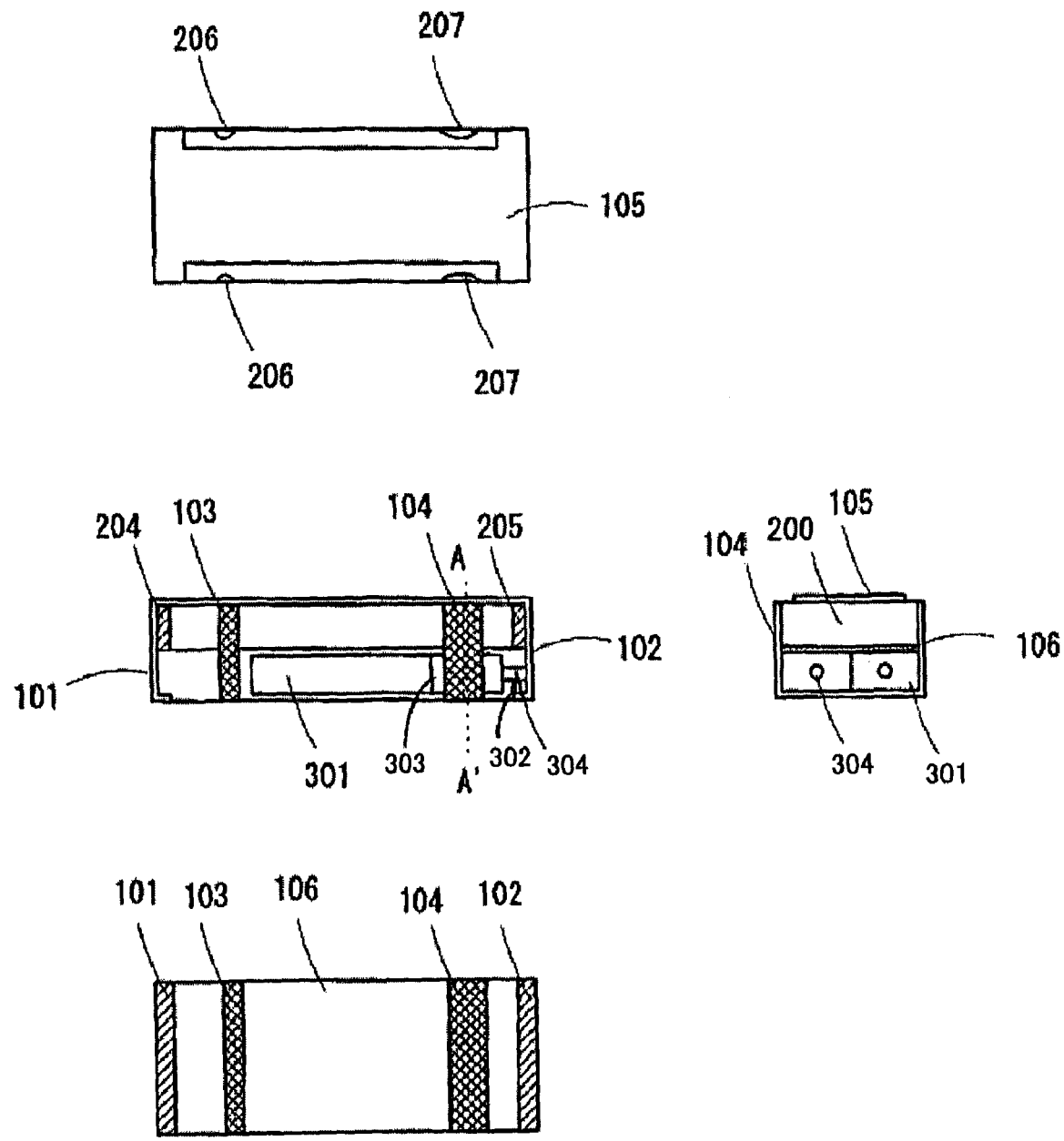
FIG. 8 illustrates a schematic view of the structure of the composite electric element according to Embodiment 7 of the present invention viewed from the overhead, a schematic perspective view viewed from the side, a cross sectional view viewed along line A-A', a schematic view viewed from the bottom.
Figure 9:
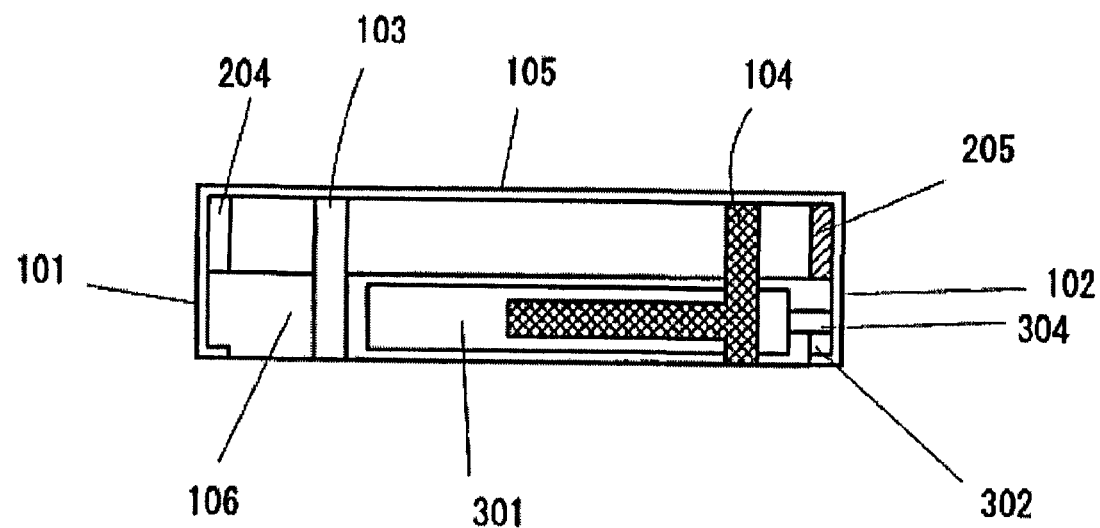
FIG. 9 is a schematic perspective view illustrating the structure of the solid electrolytic capacitor according to Embodiment 9 of the present invention viewed from the side.
Figure 10:
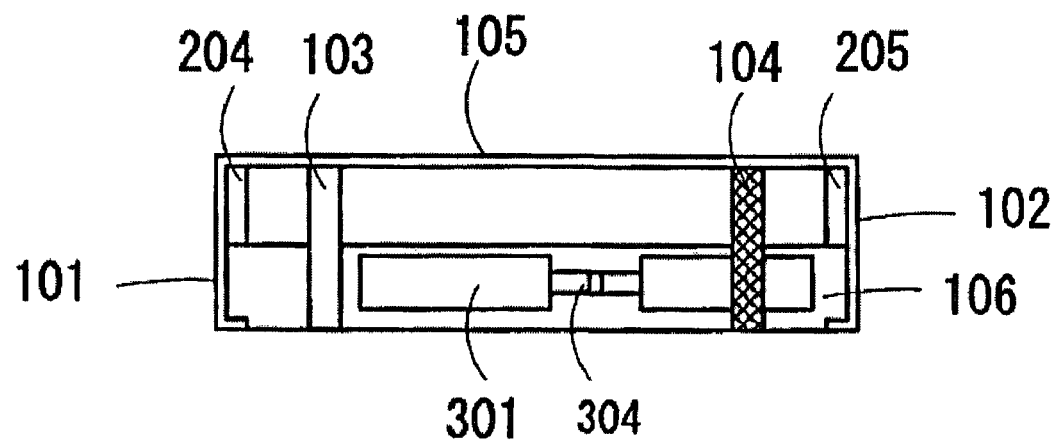
FIG. 10 is a schematic perspective view illustrating the structure of the composite electric element according to Embodiment 9 of the present invention viewed from the side.
Figure 11:
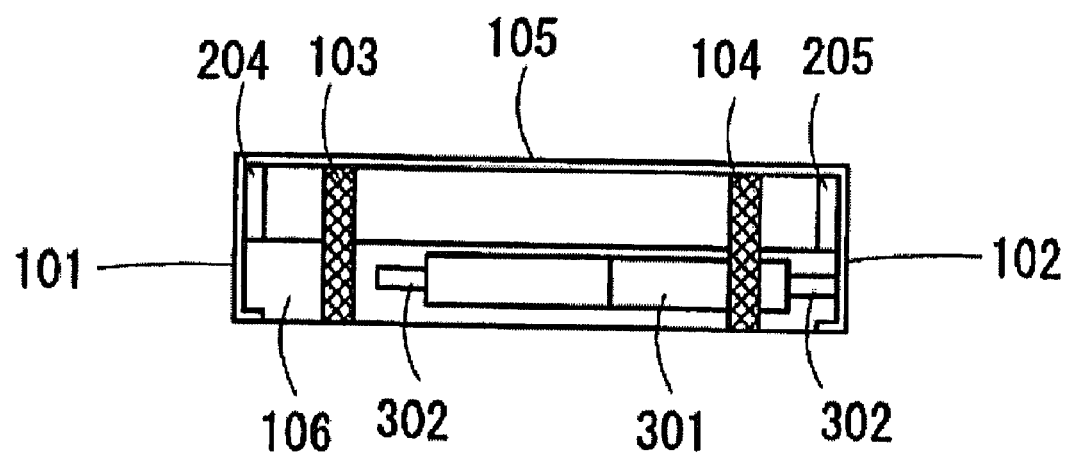
FIG. 11 is a schematic perspective view illustrating the structure of the composite electric element according to Embodiment 9 of the present invention viewed from the side.
Figure 12:
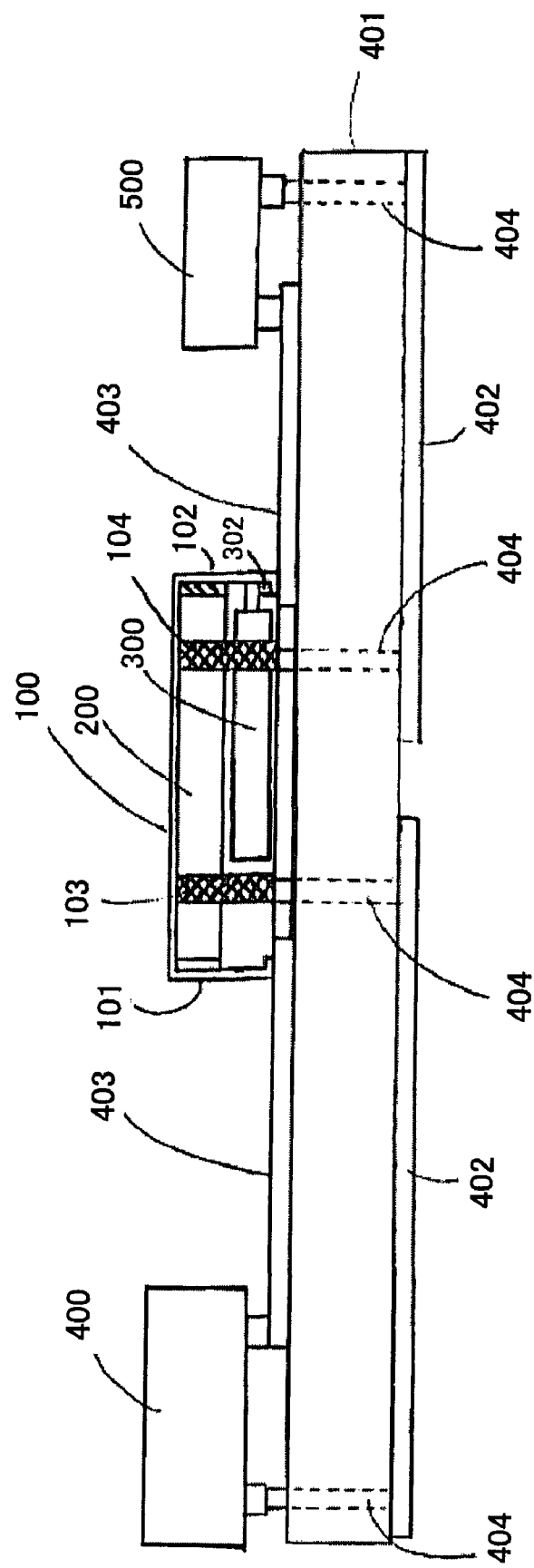
FIG. 12 is a schematic view illustrating the structure of the present invention in use.
Figure 13:
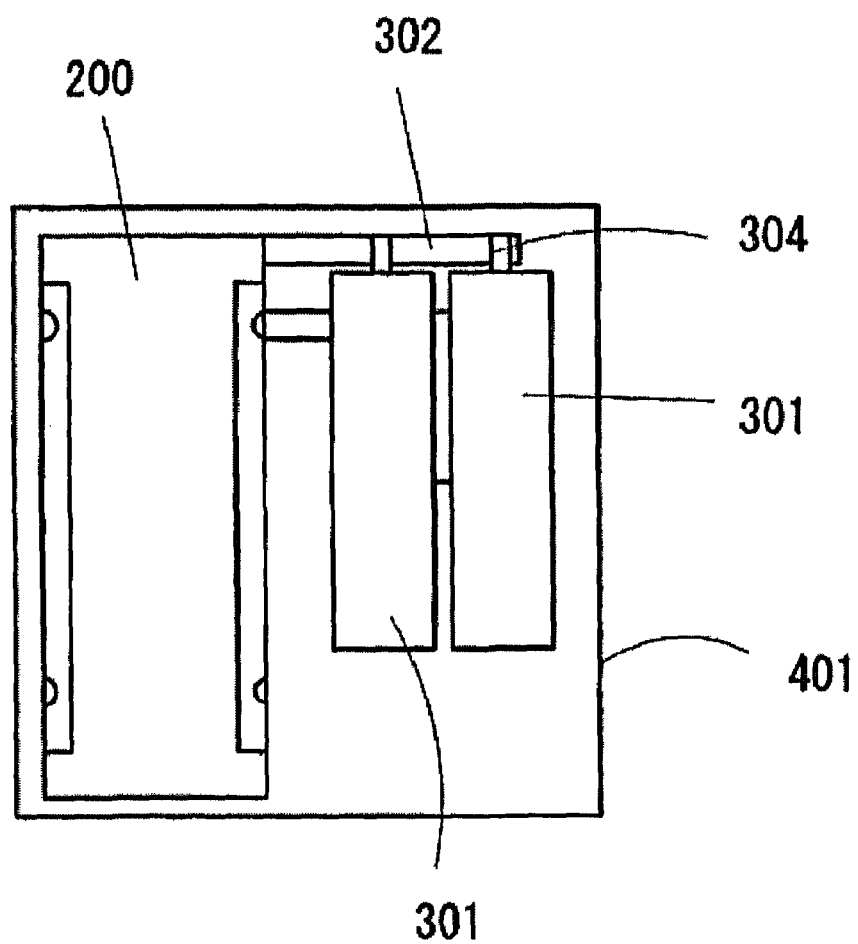
FIG. 13 is a schematic view illustrating the structure of the composite electric element according to Embodiment 11 of the present invention viewed from the overhead.
Figure 14:
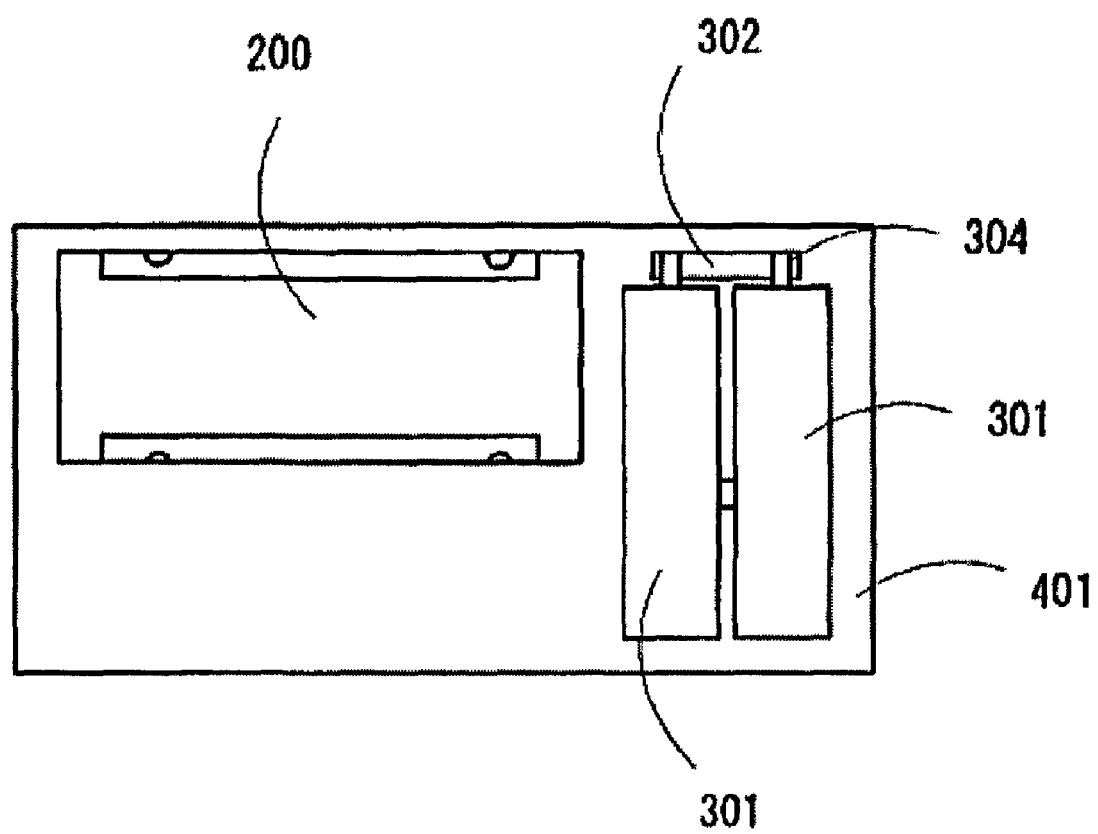
FIG. 14 is a schematic view illustrating the structure of the composite electric element according to Embodiment 11 of the present invention viewed from the overhead.
Figure 15:
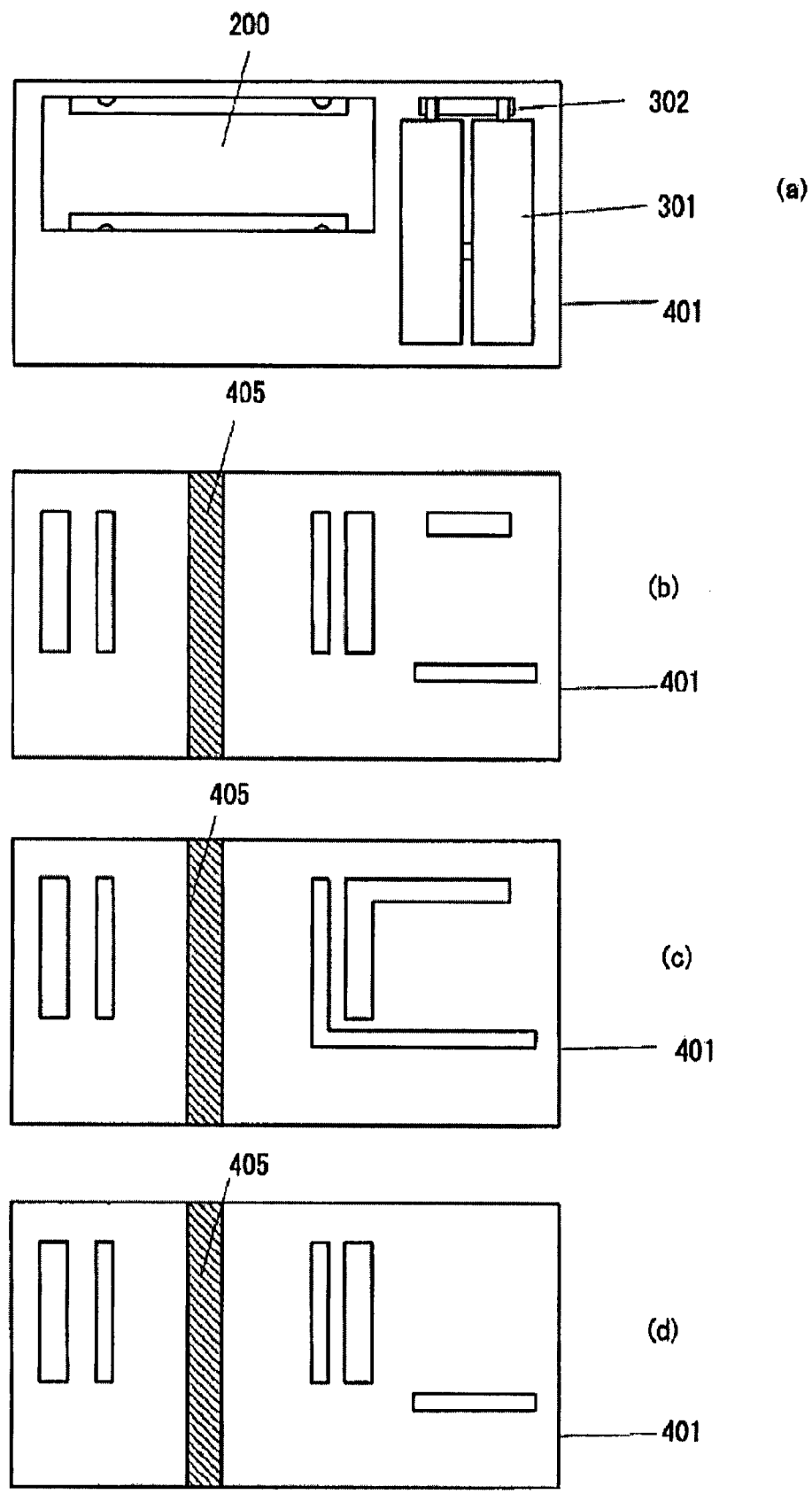
FIG. 15 illustrates a schematic view of the structure of the composite electric element according to Embodiment 12 of the present invention viewed from the overhead, and schematic views of the upper layer, the intermediate layer, and the bottom layer of the substrate.
Figure 16:
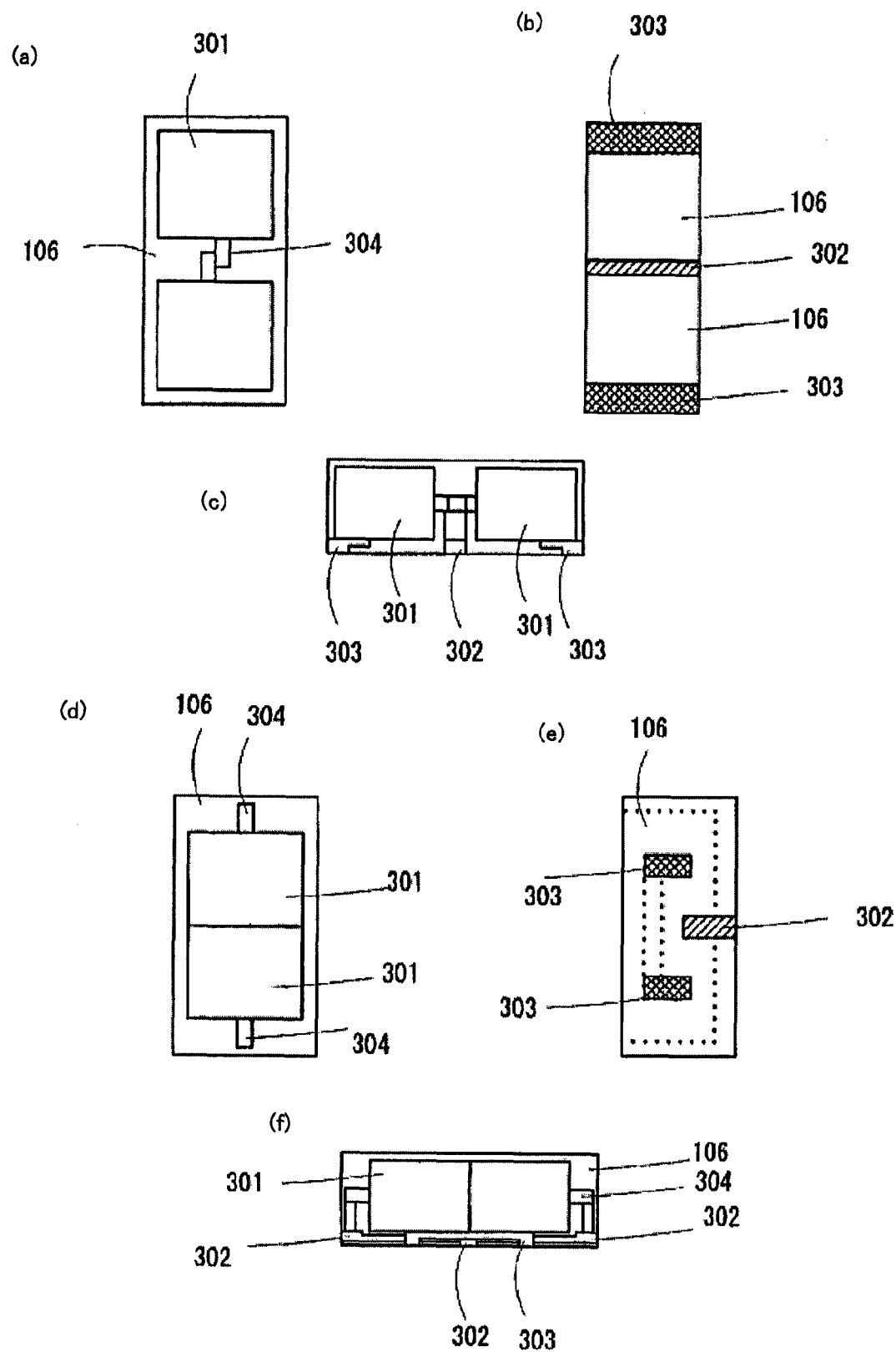
FIG. 16 illustrates schematic perspective views of the structure of the composite electric element according to Embodiment 13 of the present invention, respectively viewed from the overhead, the bottom and the side.
Figure 17:
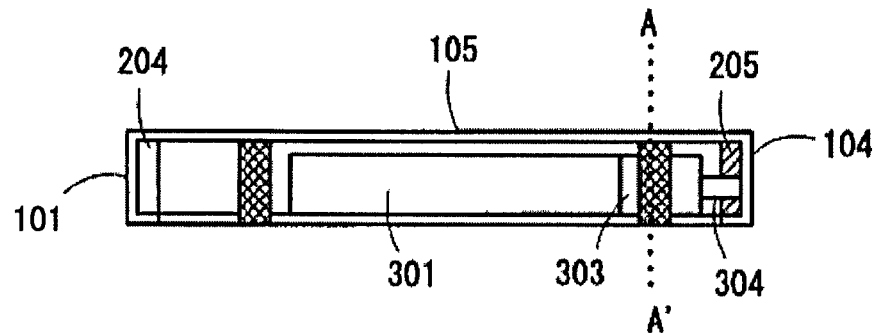
FIG. 17 illustrates a schematic perspective view of the structure of the composite electric element according to Embodiment 10 of the present invention viewed from the side, and a cross sectional view viewed along line A-A'.
Figure 17:
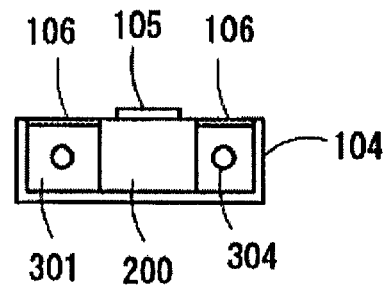
Figure 18:
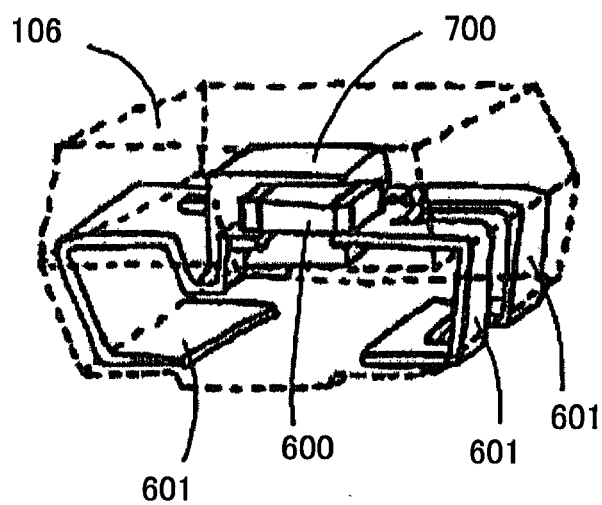
FIG. 18 is a schematic view illustrating the structure of the conventional composite electric element.

100: Composite Electric Element, 101: Seventh Electrode, 102: Tenth Electrode, 103: Eighth Electrode, 104: Ninth Electrode, 105: Conductive Plate, 106: External Resin Member, 200: Electric Element, 202: First Conductive Layer, 203: Second Conductive Layer, 204: First Electrode, 205: Second Electrode, 206: Third Electrode, 207: Fourth Electrode, 208:

Dielectric Layer, 211: Substrate, 300: Solid Electrolytic Capacitor, 301: Capacitor Element (including Cathode Part), 302: Fifth Electrode, 303: Sixth Electrode, 304: Anode Part, 400: Power Source, 401: Substrate, 402: Ground, 403: Signal Line, 404; Via Hole, 405: Slit, 500: Electric Load, 600: Ceramic Capacitor, 601: Lead Frame, 700: Tantalum Solid Electrolytic Capacitor, 800: Composite Part

The invention claimed is:

1. A composite electric element comprising:
an electric element part; and
a solid electrolytic capacitor part; wherein
the electric element part includes:
  a plurality of first conductive layers,
  a plurality of second conductive layers facing each first conductive layer across a dielectric layer,
  a first electrode,
  a second electrode,
  a third electrode, and
  a fourth electrode,
  the plurality of first conductive layers are connected parallel to each other between the first electrode and the second electrode,
  the plurality of second conductive layers are connected parallel to each other between the third electrode and the fourth electrode;
the solid electrolytic capacitor part includes:
  a capacitor element including an anode member, a dielectric film and a cathode layer, the dielectric film and the cathode layer are sequentially formed in this order on a surface of the anode member,
  a fifth electrode, and
  a sixth electrode,
  the anode member is connected to the fifth electrode,
  the cathode layer is connected to the sixth electrode; and
the composite electric element further comprises a seventh electrode, an eighth electrode, a ninth electrode, and a tenth electrode,
  the first electrode is connected to the seventh electrode,
  the second electrode and the fifth electrode are connected to the tenth electrode,
  the third electrode is connected to the eighth electrode,
  the fourth electrode and the sixth electrode are connected to the ninth electrode.

2. The composite electric element according to claim 1, wherein
the electric element part is disposed on the solid electrolytic capacitor part; and
the seventh electrode, the eighth electrode, the ninth electrode, and the tenth electrode are disposed beneath the solid electrolytic capacitor part.

3. The composite electric element according to claim 2, wherein
the composite electric element has a bottom surface, a pair of first side surfaces perpendicular to the bottom surface, a pair of second side surfaces perpendicular to the bottom surface, and an upper surface parallel to the bottom surface;
the first electrode is disposed along one first side surface of the pair;
the second electrode is disposed along the other first side surface of the pair;
the seventh electrode, the eighth electrode, the ninth electrode, and the tenth electrode are disposed in this order, from the side of the one first side surface, in a direction in which the pair of the first side surfaces face each other, and exposed on the bottom surface.

4. The composite electric element according to claim 3, wherein
the third electrode is connected to the eighth electrode via a first band member vertically extending along one and/or the other second side surface of the pair;
the fourth electrode is connected to the ninth electrode via a second band member vertically extending along one and/or the other second side surface of the pair.

5. The composite electric element according to claim 4, wherein
the first band member and the eighth electrode are unified; and
the second band member and the ninth electrode are unified.

6. The composite electric element according to claim 5, wherein
the second band member, the sixth electrode and the ninth electrode are unified.

7. The composite electric element according to claim 3, wherein
a conductive plate is connected, between the first electrode and the second electrode, parallel to the plurality of first conductive layers;
the resistance of the conductive plate between the portion connected to the first electrode and the portion connected to the second electrode is less than that of each first conductive layer between the portion connected to the first electrode and the portion connected to the second electrode; and
part of the conductive plate is disposed along the upper surface.

8. The composite electric element according to claim 7, wherein
another part of the conductive plate is disposed along the pair of first side surfaces;
the first electrode is connected to the seventh electrode with the part of the conductive plate disposed along one first side surface of the pair;
the second electrode is connected to the tenth electrode with the part of the conductive plate disposed along the other first side surface of the pair.

9. The composite electric element according to claim 1, further comprising a module substrate; wherein
the electric element part and the solid electrolytic capacitor part are disposed on an upper surface of the module substrate;
the seventh electrode, the eighth electrode, the ninth electrode, and the tenth electrode are disposed on a bottom surface of the module substrate.

10. The composite electric element according to claim 1, wherein
a conductive plate is connected, between the first electrode and the second electrode, parallel to the plurality of first conductive layers; and
the resistance of the conductive plate between the portion connected to the first electrode and the portion connected to the second electrode is less than that of each first conductive layer between the portion connected to the first electrode and the portion connected to the second electrode.

11. The composite electric element according to claim 1, wherein
current flows across each of the plurality of first conductive layers and the plurality of second conductive layers in opposite directions at a time.

12. The composite electric element according to claim 1, wherein
the composite electric element is disposed in an electric circuit for connecting a power source and an electric load, each of the power source and the electric load having an anode terminal and a cathode terminal;
the seventh electrode is connected to the anode terminal of the power source;
the eighth electrode is connected to the cathode terminal of the power source;
the ninth electrode is connected to the cathode terminal of the electric load; and
the tenth electrode is connected to the anode terminal of the electric load.

* * * * *